United States Patent
Borkholder et al.

(10) Patent No.: US 12,258,952 B2
(45) Date of Patent: Mar. 25, 2025

(54) LEAK-FREE, DIFFUSION-BLOCKING CHECK VALVE, PUMP AND METHOD

(71) Applicants: David A. Borkholder, Canandaigua, NY (US); Farzad Forouzandeh, Pacifica, CA (US)

(72) Inventors: David A. Borkholder, Canandaigua, NY (US); Farzad Forouzandeh, Pacifica, CA (US)

(73) Assignee: Rochester Institute of Technology, Rochester, NY (US)

( * ) Notice: Subject to any disclaimer, the term of this patent is extended or adjusted under 35 U.S.C. 154(b) by 89 days.

(21) Appl. No.: 18/108,384

(22) Filed: Feb. 10, 2023

(65) Prior Publication Data

US 2024/0271610 A1    Aug. 15, 2024

(51) Int. Cl.
*F04B 43/04* (2006.01)
*F04B 19/00* (2006.01)
*F16K 15/14* (2006.01)
*F16K 99/00* (2006.01)

(52) U.S. Cl.
CPC .......... *F04B 43/043* (2013.01); *F04B 19/006* (2013.01); *F16K 15/1441* (2021.08); *F16K 99/0015* (2013.01)

(58) Field of Classification Search
CPC .. F04B 19/006; F04B 43/043; F16K 15/1441; F16K 99/0001; F16K 99/0015; F16K 99/0057
See application file for complete search history.

(56) References Cited

U.S. PATENT DOCUMENTS

| | | | |
|---|---|---|---|
| 6,069,392 A | 5/2000 | Tai et al. | |
| 6,240,962 B1* | 6/2001 | Tai | F16K 15/144 |
| | | | 137/859 |
| 7,600,533 B2 | 10/2009 | Tai et al. | |
| 2002/0030721 A1 | 3/2002 | Asakawa et al. | |
| 2002/0168278 A1 | 11/2002 | Jeon et al. | |
| 2004/0052657 A1 | 3/2004 | Van Lintel et al. | |
| 2008/0035875 A1* | 2/2008 | Tai | F16K 99/0005 |
| | | | 29/890.122 |
| 2015/0276073 A1 | 10/2015 | Cefai | |

OTHER PUBLICATIONS

The International Search Report and the Written Opinion of the International Searching Authority, PCT Patent Application No. PCT/US2023/012821, dated Jul. 19, 2023, pp. 1-19.

(Continued)

*Primary Examiner* — Kenneth J Hansen
(74) *Attorney, Agent, or Firm* — Bond, Schoeneck & King, PLLC

(57) ABSTRACT

A closed leak-free, diffusion-blocking one-way check valve is composed of a substrate having a flow passage through the substrate, the flow passage has a sealing surface between the substrate and a membrane preventing flow through the flow passage. A thin film having internal stress is disposed on the membrane which induces deformation of the membrane biasing the membrane resulting in the sealing surface in a closed orientation. A method for fabrication and pump utilizing the check valve are disclosed.

14 Claims, 8 Drawing Sheets

(56) References Cited

OTHER PUBLICATIONS

Lo, Ronalee et al., "A Modular Heat-Shrink-Packaged Check Valve With High Pressure Shutoff," Journal of Microelectromechanical Systems, vol. 20, No. 5, Oct. 2011, pp. 1163-1173.

Lo, Ronalee et al., "A passive MEMS drug delivery pump for treatment of ocular disease," Biomed Microdevices, Oct. 2009, ePub. Apr. 25, 2009, 11(5):959-70, DOI: 10.1007/s10544-009-9313-9.

Hu, Min et al., "A silicon-on-insulator based micro check valve," Journal of Micromechanics and Microengineering, Mar. 2004, 14(3):382-387, DOI:10.1088/0960-1317/14/3/010, pp. 382-387.

Chen, Po-Jui, et al., "Floating-disk parylene micro check valve," 2007 IEEE 20th International Conference on Micro Electro Mechanical Systems (MEMS), Kobe, Japan, Jan. 2007, DOI: 10.1109/MEMSYS.2007.4433069, pp. 453-456.

Johnson, Dean, "Integration technologies for implantable microsystems" (2013), Thesis, Rochester Institute of Technology, pp. 1-137, Retrieved from the Internet on Aug. 15, 2024: <URL: https://repository.rit.edu/theses/4634/>.

Johnson, D. G. & Borkholder, D. A., "Towards an implantable, low flow micropump that uses no power in the blocked-flow state," Micromachines 2016, 7, 99, pp. 1-16, doi: 10.3390/mi7060099.

Sari, I., Zeimpekis, I. & Kraft, M., "A full wafer dicing free dry release process for MEMS devices," Procedia Engineering (2010), pp. 850-853, doi: 10.1016/j.proeng.2010.09.242.

Overstolz, T., Clerc, P. A., Noell, W., Zickar, M. & DE Rooig, N. F., "A clean wafer-scale chip-release process without dicing based on vapor phase etching," 17th IEEE International Conference on Micro Electro Mechanical Systems, Maastricht MEMS 2004 Technical Digest pp. 717-720. doi: 10.1109/MEMS.2004.1290685.

\* cited by examiner

LEAK-FREE, DIFFUSION-BLOCKING CHECK VALVE, PUMP AND METHOD

FIELD

The present disclosure relates to a one-way diffusion-blocking check valve, method for fabrication thereof and pump utilizing the check valve.

BACKGROUND

Traditional check valves, whether based on flexible polymer (e.g., PDMS) or microelectromechanical systems (MEMS) rely on backpressure to generate a seal. For example, Hu, M. et al. A silicon-on-insulator based micro check valve. *J. Micromechanics Microengineering* 14, 382-387 (2004) discloses microfabrication techniques (a)-(f) for making a silicon-on-insulator (SOI) check valve, which is incorporated herein in its entirety. This check valve is fabricated in an open position and requires high backpressure to generate a seal. FIG. 11 shows the check valve operating in a flow rate regime of ml/min.

Moreover, in the ultra-low flow rate regime (nl/min to µl/min and below) these prior art valves fail to seal due to low-Reynolds laminar and Stokes flow around the valve. Hence, these valves fail to rectify flow for very slow actuators, such as the phase change materials, and they do not block diffusion mediated transport.

Previously, this problem has been solved with either active valves or spring-loaded valves, or the problem of leakage is not solved resulting in poor pumping efficiency. However, springs strong enough to operate in the ultra-low flow rate regime are not compatible with small valves since the overall assembly required to accommodate such strong springs would be too large for use in these ultra-low flow rate regimes. There are no micro-scale options available for diffusion blocking. There is a need for a normally closed, leak-free check valve specifically designed for this ultra-low flow rate regime.

SUMMARY

In accordance with one aspect of the present invention, there is provided a closed diffusion-blocking one-way flow check valve, including:
- a flow passage in a one-way direction through the check valve from an inlet to an outlet;
- a handle including the inlet on one side of the handle and a valve seat disposed on a side of the handle opposite the inlet side along the flow passage;
- a membrane including a flap tethered to the membrane by a plurality of tethers and the outlet including an opening adjacent the plurality of tethers between the membrane and the flap, wherein the flap includes a valve seat contacting area on one side of the flap and an intrinsically stressed biasing element disposed on a side of the flap opposite the valve seat contacting area; and
- a spacer layer disposed between the handle and the membrane creating a portion of the flow channel between the handle valve seat and the flap valve seat contacting area, wherein the biasing element forces the valve seat contacting area of the flap against the valve seat of the handle biasing the check valve in a closed position relative to the flow passage.

In accordance with another aspect of the present disclosure, there is provided a method for fabrication of a closed diffusion-blocking one-way check valve, including:

depositing a thin film biasing layer on a silicon layer disposed on a silicon dioxide layer embedded between a handle substrate and the silicon layer;

spin coating and patterning a photoresist on the thin film biasing layer; etching the biasing layer to expose a portion of the silicon layer;

spin coating and patterning a photoresist on the silicon layer and biasing layer; etching a flap and at least two tethers in the silicon layer to create a flow passage outlet;

spin coating and patterning a photoresist on a bottom surface of the handle substrate; etching an orifice in the handle substrate to create a flow passage inlet; and removing the embedded silicon dioxide layer between the flap and the handle substrate to create a flow passage between the inlet and the outlet of the diffusion-blocking one-way check valve in a closed position.

In accordance with another aspect of the present disclosure, there is provided a pump system utilizing two closed diffusion-blocking one-way check valves in accordance with the present disclosure.

These and other aspects of the present disclosure will become apparent upon a review of the following detailed description and the claims appended thereto.

DETAILED DESCRIPTION

Figure 1A:
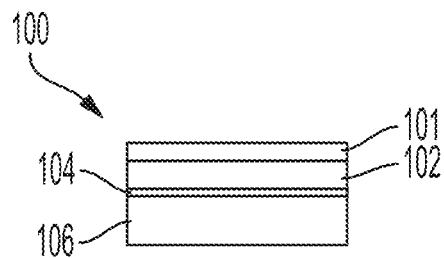
FIGS. 1A-1H represent a series of schematics showing an embodiment of a method for fabricating a one-way diffusion-blocking check valve in accordance with the present disclosure.

Disclosed is a diffusion-blocking one-way flow check valve fabricated with a flow passage in a closed position. The flow passage is disposed in a one-way direction through the check valve from an inlet to an outlet. A handle includes the inlet on one side of the handle and a valve seat disposed on a side of the handle opposite the inlet side along the flow passage. A membrane includes a flap tethered to the membrane by a plurality of tethers and the outlet. The outlet includes an opening or openings adjacent the plurality of tethers between the membrane and the flap. The flap includes a valve seat contacting area on one side of the flap and an intrinsically stressed biasing element disposed on a side of the flap opposite the valve seat contacting area. A spacer layer is disposed between the handle and the membrane creating a portion of the flow channel between the handle valve seat and the flap valve seat contacting area. The biasing element forces the valve seat contacting area of the flap against the valve seat of the handle biasing the check valve in a closed position relative to the flow passage.

Preferably, the sealing surface is a silicon-on-silicon sealing surface. This design provides angstrom scale closure, where the opening for fluid flow is due to angstrom order of magnitude surface roughness between the two membranes in contact, with controllable opening pressures. Suitable opening pressures include from 1.2 to 2.9 kPa, or from 220 to 320 kPa, as examples. The opening pressure is tunable by the design of the valve. Design parameters that can be used in combination to control opening pressure of the valve include but are not limited to the membrane material, membrane thickness, membrane diameter, number and geometry of supporting tethers between the membrane and the substrate, the geometry of the joints between the tether and the membrane, and the thickness, width, distance from center, concentricity, shape, and intrinsic stress within the thin film disposed on the membrane. For example, in an embodiment for drug delivery a micropump has a check valve on the inlet and a check valve on the outlet. The goal is two-fold: diffusion blocking (on the outlet valve) and flow rectification (combination of the inlet and outlet valves). The inlet check valve will be tuned to have a lower cracking pressure than the outlet check valve to ensure robust flow rectification.

An important feature of the present device is the use of internal stress in a deposited thin film to bias the valve membrane closed. A thin film having internal stress is disposed on the membrane which induces deformation of the membrane biasing the membrane resulting in the sealing surface in a closed orientation. Generally, film stresses are avoided in this type of MEMS processing to avoid deformation of structures that are required to be normally flat, such as the valve membrane. However, controlling thin film stress via deposition conditions is an important feature of the basic structure of this MEMS-based valve.

This design is inherently robust and provides effective one-way check-valve operation at very high back pressures of up to 4 MPa without leakage from silicon on silicon sealing surfaces. The valve is fabricated biased to the closed position. Thus, the flow passage through the valve is closed providing diffusion blocking from inlet to outlet isolating the outlet from the inlet to all forms of solute movement. In conditions where the outlet pressure is greater than or equal to the inlet pressure, the valve membrane remains in the closed position having the membrane in contact with the valve seat. As the inlet pressure is applied and increases above the outlet pressure, there will be a force on the valve membrane at the inlet which will counter (a) the force induced by the outlet pressure acting on the entire valve membrane top surface, and (b) the force induced by the thin film stress. The inlet pressure acts on the bottom surface of the valve membrane that is exposed to the inlet fluid. As the inlet pressure force exceeds (a) and (b), the valve membrane will be forced to move away from the valve seat, starting at the inlet port. As the valve membrane is moved away from the valve seat, the surface area upon which the inlet pressure acts will increase, increasing the total force experienced on the bottom side of the valve membrane. With sufficient inlet pressure, the valve membrane will be fully separated from the valve seat, providing a fluid flow path from inlet to outlet, resulting in fluid flow based on the pressure difference between inlet and outlet, and the fluidic resistance of the flow path. An increase in outlet pressure, or a decrease in inlet pressure can close the valve.

Figure 1B:
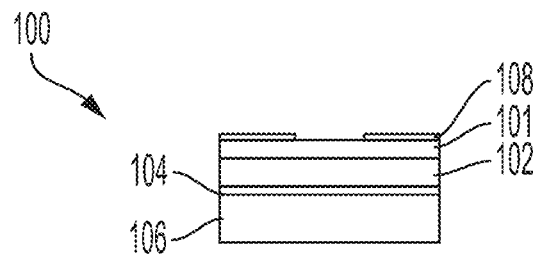
Figure 1C:
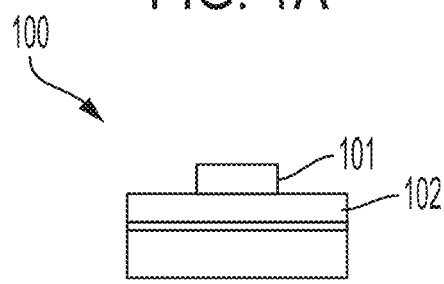
Figure 1D:
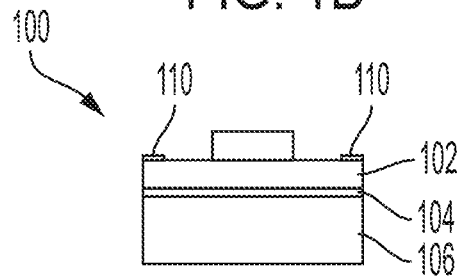
Figure 1E:
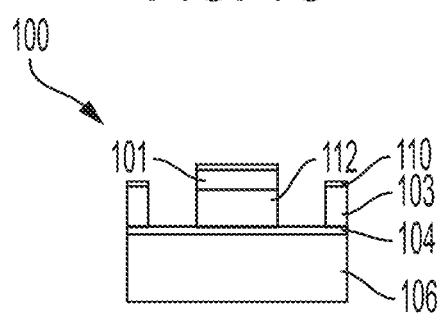
Figure 1F:
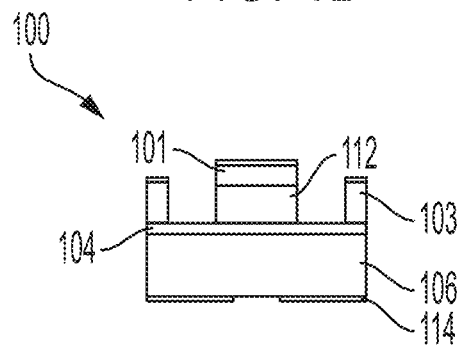
Figure 1G:
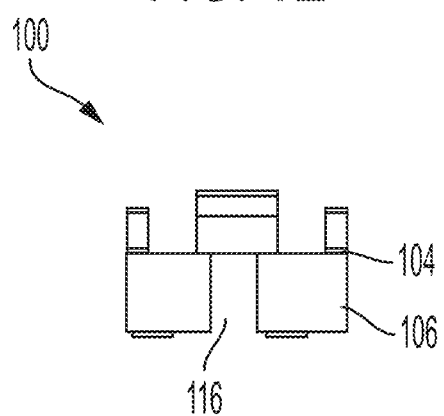
Figure 1H:
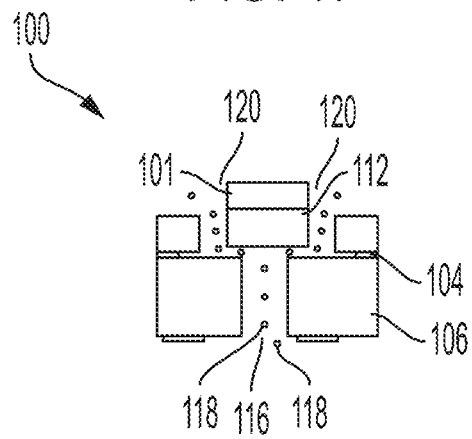
Figure 2A:
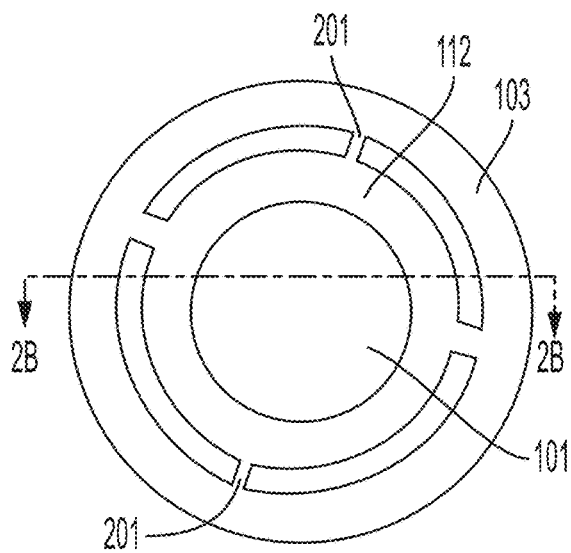
FIG. 2A is a schematic showing an embodiment of a top view of a conceptual design for a diffusion-blocking check valve.

In an embodiment, a method for fabricating a leak-free, one-way flow diffusion-blocking check valve 100 includes the following steps: a thin film biasing element 101, is deposited as a controlled intrinsically stressed layer on a top surface of a membrane 102 having an embedded oxide spacer layer 104 between the membrane 102 and a handle layer 106, as shown in FIG. 1A. The thin film can be silicon nitride deposited with intrinsic residual stress from fabrication using a plasma enhanced chemical vapor deposition (PECVD) method, where stress of film monolayers can be dynamically controlled during deposition to provide thin films of tunable stress from tensile stress to compressive stress. In this design, a compressively stressed film will generate a compressive load on the membrane to enforce a normally closed configuration of the check valve. A patterned photoresist 108 is deposited, for example by spin coating, to a top surface of the thin film 101, as shown in FIG. 1B. The thin film 101 is etched, for example by deep reactive ion etching (DRIE), as shown in FIG. 1C. A patterned photoresist 110 is deposited, for example by spin coating, to the top surface of the thin film 101 and an exposed top surface of the membrane 102, as shown in FIG. 1D. A membrane flap 112 and multiple flexible tethers 201 shown in FIG. 2A is etched, for example by DRIE, creating a rim 103 in the membrane 102, as shown in FIG. 1E. A patterned photoresist 114 is deposited, for example by spin coating, to a bottom surface of the handle layer 106, as shown in FIG. 1F. An orifice 116 is etched through the handle layer 106, for example by DRIE, as shown in FIG. 1G. A portion of the embedded oxide layer 104 under the flexible tethers 201 and membrane flap 112 is etched away, for example by hydrofluoric acid. A flow passage 118 through the valve 100 has an inlet 119 and an outlet 120, as shown in FIG. 1H.

In an embodiment, a hydrofluoric acid vapor etch can be used when etching the thin layer 104. It etches at the same rate in all directions. Thus, it will etch from the top at the outlet openings, and at the bottom from the inlet opening. It will clear those areas that are open first but doesn't etch the silicon. It then etches horizontally underneath the membrane rim and the handle adjacent to the rim. The etching can be terminated to about half the distance from the edge of the inlet to the inner edge of the outlet opening. Under the membrane it is etching from the topside inward, and from the bottom side outward, so it will remove the oxide under the membrane faster than it etches outward toward the rim (about 2× faster). Since the rim is large, the small undercut (removal of that oxide) doesn't impact function. There is plenty of rim to provide mechanical robustness.

The components of the check valve of the present disclosure can be fabricated using microfabrication techniques known in the art. However, intrinsic stress in certain components of a microfabricated check valve can cause catastrophic failure, such as, of the valve membrane or the tethers that affix the membrane to the main valve structure. For this reason, the manufacturing process for such valves involves control of parameters to limit intrinsic stress in certain films; the goal is near zero stress in the functional valve components to ensure well controlled and robust valve operation. The incorporation of a thin film with intrinsic stress at the top of the membrane can control operation of the valve function. The magnitude and type (compressive vs tensile) of the thin film stress can be carefully controlled and balanced against other valve characteristics to fabricate a robust valve with a normally closed and leak-free properties described herein. The valve is fabricated in a closed position without backpressure.

The cracking pressure of the valve (inlet pressure required to enable fluid flow) can be tuned based on the dimensions, shape, and tethering (number and shape of the tethers) of the valve membrane flap, and the dimensions, shape, and intrinsic stress of the thin film which is deposited on top of the valve membrane. The design also allows for the opening pressure of the valve to be tuned, based on the internal stress of the thin film deposited on top of the valve membrane. This is an important feature for micropump designs utilizing a single actuation chamber and inlet and outlet check valves. The opening pressure for the inlet pressure can be set to a lower valve than the outlet pressure to ensure robust flow rectification for the overall pump. This can be finely tuned, much more so than with spring-based systems in larger check valves.

The resistance to leakage under back-pressure can also be tuned based on the contact surface area between the valve membrane and the valve substrate or handle layer. By tuning the film stress from 10 to 100 MPa the contact area changes from 0.077 to 0.114 mm$^2$ and the leak rate reduces from 31 to 27.7 nL/year. The correlation between stress induced in the film, contact area, and leak rate is shown in FIG. 3B. The leak-free, diffusion-blocking check valve can operate in a flow rate regime of from 1 nl/min to 5000 nl/min.

Unlike most check valves, this design operates independent of backpressure and without an externally applied force. It does not require any backpressure to remain closed, yet it also provides robust sealing against leakage at high back pressures. The design is based on dimensionally stable silicon and thin films used in silicon processing. This is a major advantage in terms of predictable performance as compared to polymer-based valves. The materials are all known to be biocompatible, with extensive use in cortical implants. This is an important benefit for biological or implant applications.

Silicon-based MEMS techniques can be used to create check valves in accordance with the present disclosure with silicon-to-silicon sealing surfaces biased closed with controlled stress thin films. Finite element modeling followed by fabrication and testing will confirm flow rectification and leak-free performance up to 5 MPa backpressure. The handle substrate is sufficiently rigid so as not to deflect at the pressures generated within the flow regime. In an embodiment, a MEMS fabrication process uses optically flat, single crystal silicon sealing surfaces, biased closed via compressive stress of a patterned thin film.

The present SOI based check valve differs from conventional SOI check valves with the addition of a silicon nitride layer with intrinsic residual stress from fabrication using a plasma enhanced chemical vapor deposition (PECVD) method, where stress of film monolayers can be dynamically controlled during deposition to provide thin films of tunable stress from tensile to compressive. In this design, a compressively stressed film will generate a compressive load on the valve membrane to enforce a normally close configuration of the check valve. Deep reactive ion etching can define the inlet channel and the outer perimeter for the release of the valve, which can be sized independently of the deformable membrane to tune the outer diameter for incorporation into different fluidic pumping devices. A hydrofluoric acid vapor etch can remove the buried oxide to release the valve membrane.

This check valve could be used in microfluidic applications that involve low flow rates or require blocking of diffusion during periods where no pumping is occurring. Any implanted pump could utilize this check valve (even at high flow rates). The check valve design can accommodate a very small size creating opportunities for integration into emerging micro-scale pumping mechanisms. The check valve has a length in the flow direction (thickness) of less than 5 mm, preferably less than 1 mm. The check valve has a diameter of less than 1 cm. This valve can also be used in hydraulic systems for prosthetic implants. In contrast prior systems that are actively closed require either power, or a load spring. Both make the overall system large.

This valve could be used in any pumping system that requires micropumps. This includes drug delivery, lab on chip applications, clinical diagnostics, and hydraulic prosthetics. Drug delivery is a major application area, where isolating the drug reservoir from the biological system is critical. This applies to inner ear drug delivery, diabetes, cancer, etc.

Figure 4A:
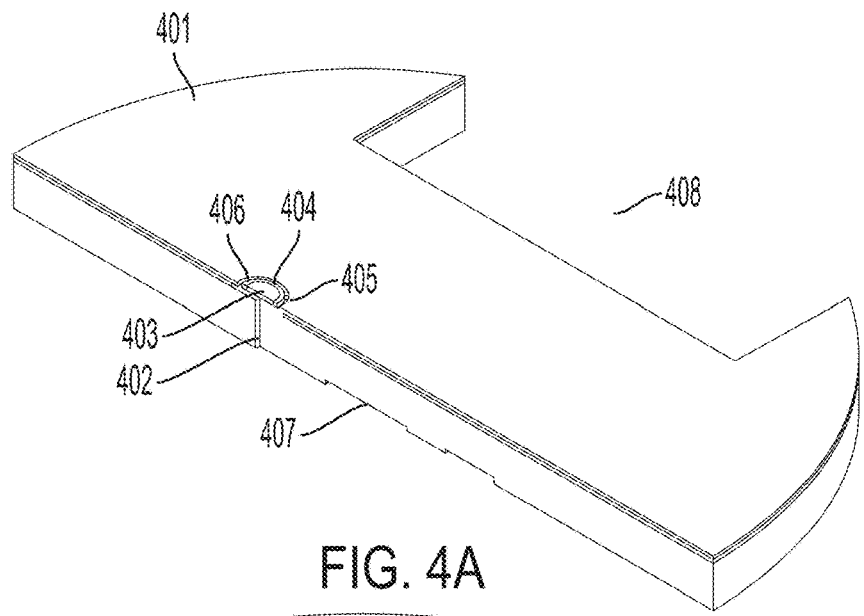
FIG. 4A is a schematic showing a perspective view of a cross-section of a bisected top wafer of a pump utilizing an ultra-low flow rate regime.
Figure 4B:
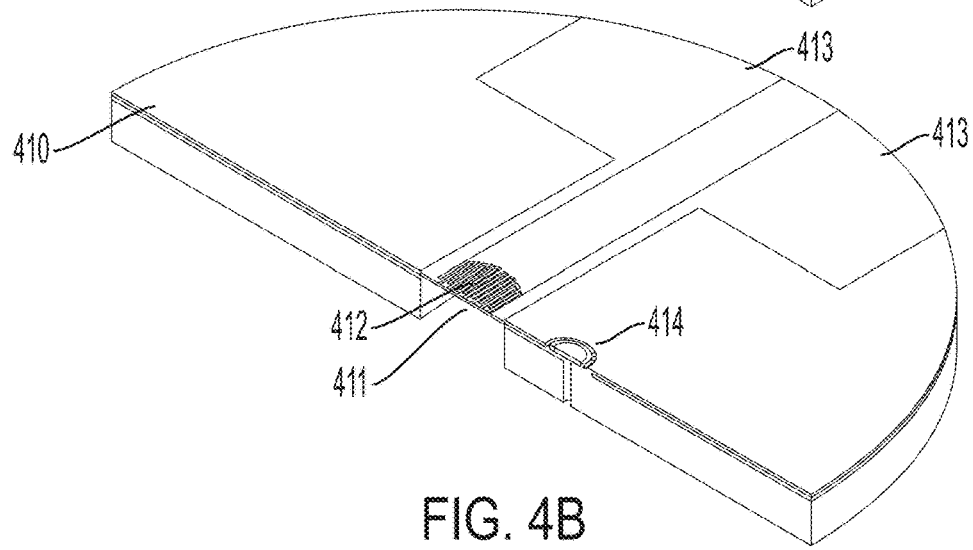
FIG. 4B is a schematic showing a perspective view of a cross-section of a bisected bottom wafer of the pump and FIG. 4C is a schematic showing a perspective view of a cross-section of the bisected top and bottom wafers of the pump utilizing an ultra-low flow rate regime.
Figure 4C:
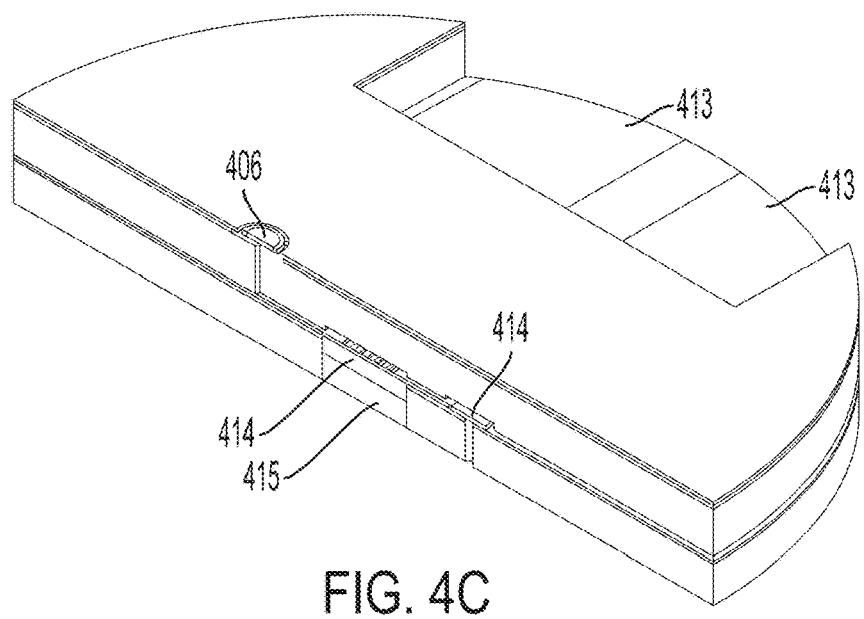

The valve of the present disclosure can be used, for example, in a microfluidic pump. In an embodiment, FIG. 4A shows a cross-section of the bisected top wafer 401 of a pump, including an inlet channel 402, valve membrane 403 and tethers 404, and Si$_3$N$_4$ thin film 405 of an outlet check valve 406; pump chamber and flow channel 407; and electrical connect cutout 408. FIG. 4B shows a cross-section of the bisected bottom wafer 410 of the pump, including a pump actuation membrane 411; serpentine heater 412; two electrical contacts 413; and an inlet check valve 414 of the same construction as the outlet check valve 406. FIG. 4C shows an embodiment of a pump having a top 401 and bottom 410 fused wafers utilizing two check valves for use in a cylinder or tube capable of operating in an ultra-low flow rate regime in accordance with the present disclosure. A wax deposition 414 underneath the pump membrane and epoxy 415 sealing of the wax in an actuation chamber can be seen. The pump system integrates an inlet and an outlet valve, with a fluidic actuator between them. The actuator relies on thermal phase change materials (e.g., wax), with an integral resistive heater on the actuator membrane. As current is passed through the resistive heater, the thermal phase change material heats and expands creating an actuation force on the actuator membrane. The valves are orientated such that this increased pressure within the actuator chamber enhances inlet valve closure, while opening the outlet valve. The fluid within the actuation chamber is thus expelled from the pump through the outlet valve. As the phase change material cools and pressure within the actuator chamber reduces, the outlet valve closes. This forces the inlet valve to open as the phase change material continues to cool and shrink, pulling fluid through the inlet valve into the actuation chamber. The process is repeated with each pump cycle ejecting a bolus of fluid from the outlet valve and pulling a new bolus of fluid in through the inlet valve.

Figure 5:
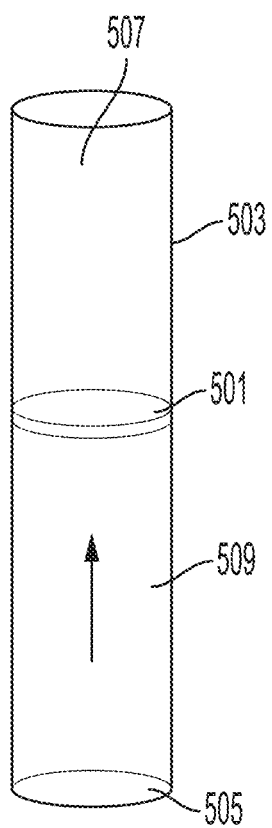
FIG. 5 is a schematic showing a disc-shaped pump utilizing two one-way diffusion-blocking check valves shown inserted in a cylinder which pumps fluid through the cylinder.

In a system a disc-shaped pump, such as that shown in FIG. 4, can be inserted in a tube or cylinder to pump fluid through the tube or cylinder. In an embodiment, FIG. 5 shows a disc-shaped pump 501 disposed in a cylinder 503 having a fluid inlet 505 and fluid outlet 507 through which fluid can be pumped in a flow direction 509 from the fluid inlet 505 to the fluid outlet 507.

Figure 6:
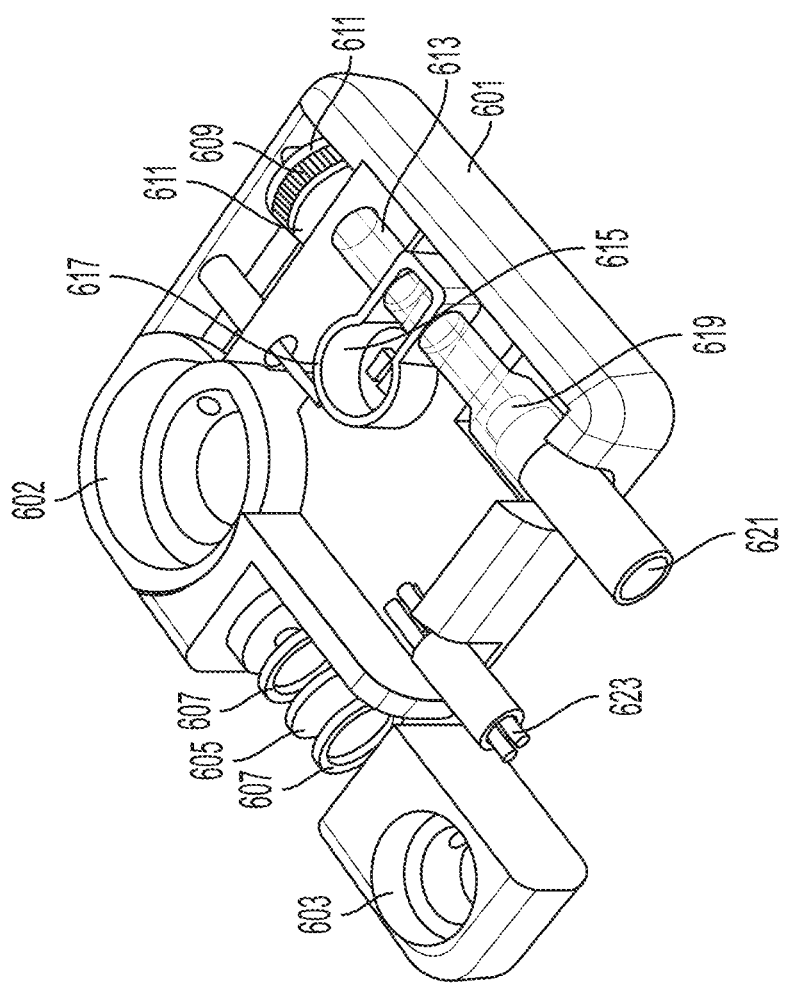
FIG. 6 is a schematic showing a perspective view of the internal components of a micropump design incorporating the one-way diffusion-blocking check valves.

In an embodiment, the internal components of a micropump assembly 601 are shown in FIG. 6. A refill port 603 with septa, and reservoir housing with functional reservoir 602 are fabricated as two separate assemblies. To fabricate an in-line pathogen filter 605, commercially available PES sheets with 0.2 µm pore size and 130 µm thickness are cut into 2-mm-diameter circles using a biopsy punch. The filter 605 is sandwiched between two custom-made micro-molded silicone rubber O-rings 607 (Nusil MED6215) and placed in the designated hole in the refill port part using a commercially available vacuum wand. This same fabrication approach will be used for the inlet valve 609: a 2-mm outer diameter MEMS-fabricated valve will be sandwiched between two custom O-rings 611 with compression force provided by a valve holder 613. This process is used in fabrication of the septum cap and cavity cap in the current reservoir. The micropump 601 will be fabricated separately using a 1-mm ID tubing tapered down to 0.3-0.5 mm ID in the region of the actuator 615. The dimension can be adjusted to provide the desired stroke volume for each actuation. The micropump 601 will be built on a PCBA containing the control electronics, and a resistor/thermistor pair for closed-loop control of the thermal phase change actuator. The electronics of the micropump will use a microcontroller (MCU) which is 3.3×3.1×0.5 mm$^3$. A dedicated thermistor for ambient temperature monitoring will be integrated for enhanced control of the thermal phase change actuator dynamic response. 3D printing defines the actuator chamber 617, with subsequent placement of the tapered microtubing segment containing the outlet check valve 619. The inlet end of the micropump tubing is fixed and sealed to the valve holder 613 using biocompatible cyanoacrylate. The outlet port 621, a 3-mm long 18 Ga (1.27 mm OD) commercially available titanium tubing is inserted into the tubing and sealed to the microsystem wall using cyanoacrylate. Micropump assembly is then completed with filling/encapsulation with long-term implantable silicone (Nusil MED6215) and Parylene sealing. The micropump is then connected with the cannula via this outlet port 621. To ensure leak-free connection with this mm-scale design, an experiment showed that two 1 mm ID tubing sections could be press fit onto the 3-mm long, 18 Ga outlet port with 1 mm overlap. The tubing/connection is filled with dye and pressurized to 200 kPa for 3 days with visual observation under a microscope every 12 hours. No leak was observed, providing confidence this press connection is robust. The MEMS outlet check valve 619 will be integrated within the microtubing. The MEMS check valve will be held by a vacuum wand pin and inserted into the tubing under microscope observation until there is resistance due to the tubing diameter reduction (at the actuator tubing section). A 1.524 mm ID PTFE heat shrink sleeve (Zeus, Inc.) capable of shrinkage to 0.0 mm ID will be placed around the valve with local temperature increase to compress the tubing wall against the valve perimeter to form a seal. The rigid structure and well-defined exterior wall surfaces of the MEMS-based check valves will facilitate a tight seal, consistent with the requirements for a diffusion blocking valve. The micropump will be powered through a head mounted replaceable battery (7.8×4 mm Li-ion coin cell, 0.7 g) within a 3D printed housing, with transcutaneous wired connections 623 to the micropump. While the design is compatible with integration of an implanted battery, this would require placing the subject under anesthesia for recharging. The combination of updated electronics and inclusion of the check valves to allow a single actuator will enable overall system power to be reduced from 25 mW to ~2.2 mW when pumping at 50 nl/min. This app will have an engineering interface to load calibration information into each micropump and to define the closed-loop control parameters for the pump chamber. A separate user interface will allow end users to select pump rate, pump profiles, and to start and stop the pump once implanted. Briefly, in an environment that mimics the heat transfer properties of the subcutaneous space, the micropump flow rates at different actuation frequencies and ambient temperatures will be characterized with backpressures representing 10× those anticipated in this application. These tests will be repeated with fluid viscosities ranging from 1 cP (water) to 20 cP (370 mg/ml Iopamidol contrast agent).

The disclosure will be further illustrated with reference to the following specific examples. It is understood that these examples are given by way of illustration and are not meant to limit the disclosure or the claims to follow.

Prophetic Example 1—Conceptual Design of Diffusion-Blocking Check Valve

Figure 2B:
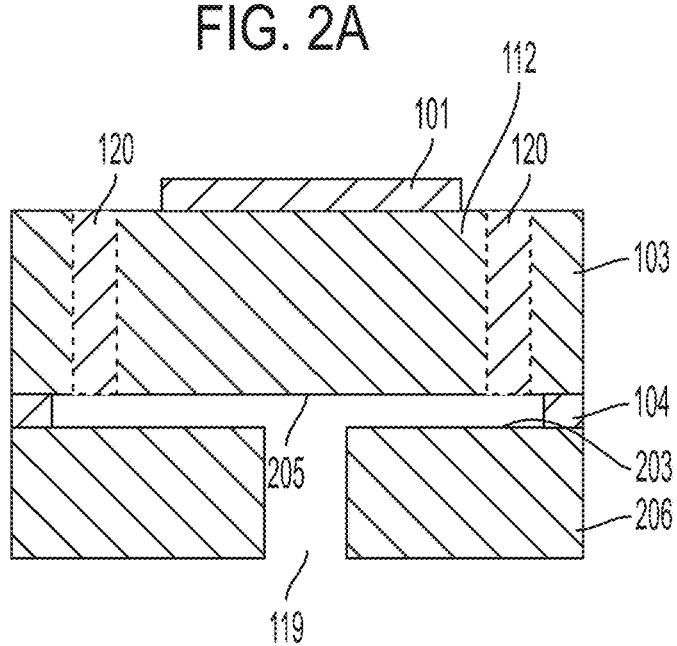
FIG. 2B is a schematic showing a cross-section of the check valve shown in FIG. 2A.
Figure 2C:
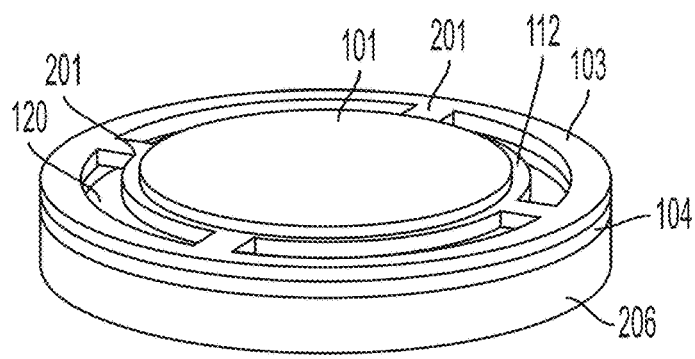
FIG. 2C is an isometric view of the check valve shown in FIG. 2A.

A leak-free check valve design and simulation is shown in FIGS. 2A-2C in the open position. FIG. 2A is a top view of the conceptual design which shows the membrane rim 103 is connected to the membrane flap 112 and thin film 101 by four tethers 201.

FIG. 2B is a cross-sectional view of the valve showing geometrical parameters and materials for the passive device. The valve 100 is shown in the open position with the flow passage between a valve seat 205 and valve seat contacting area 203 of the handle layer 206 between the inlet 119 and the outlet 120 through the valve, as shown in FIG. 2B.

FIG. 2C is an isometric conceptual view of the SOI check valve design, showing each physical layer. The simulated geometry is a straightforward 4 tether 201 configuration, embedded oxide layer 104 with the following parameters: 670 µm silicon handle 206, 5 µm membrane 101 thickness, 500 nm gap 120 between membrane 112 and silicon handle 206, 1 mm membrane 112 diameter (dsi), 900 µm silicon nitride diameter 101 (dsinx), 100 µm inlet channel 119 diameter (di), and each tether 201 with 50 µm width and length.

Figure 2D:
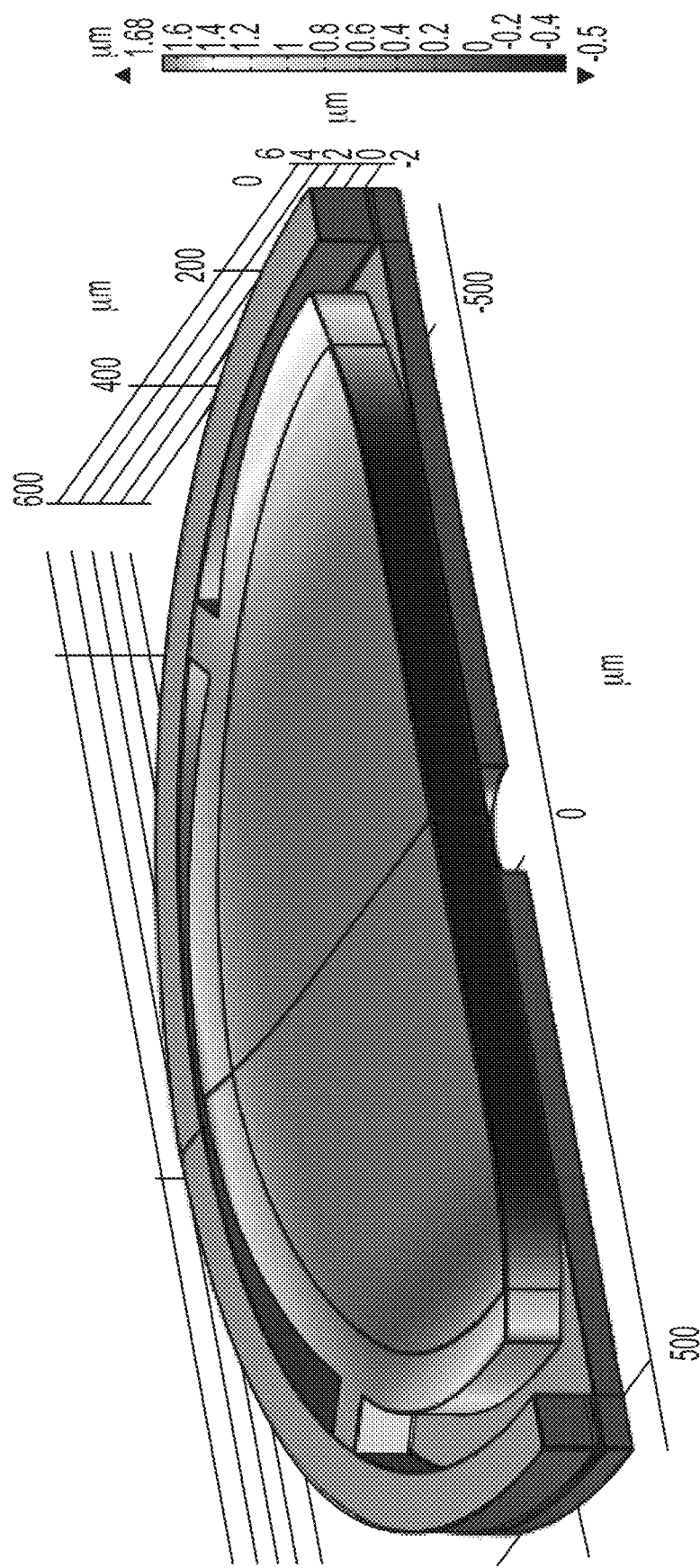
FIG. 2D shows a perspective view and FIG. 2E shows a cross-sectional view of a simulation of the residual stress in the check valve in a closed position.
Figure 2E:
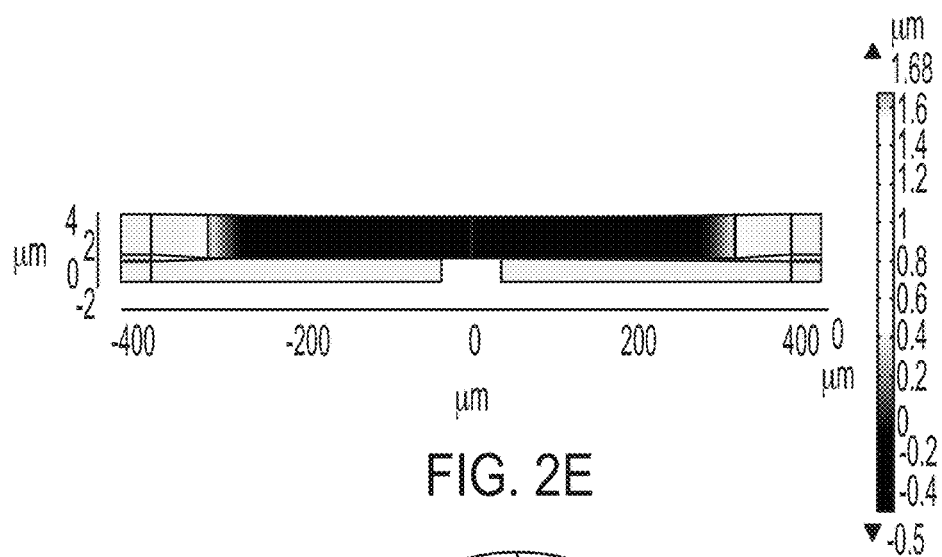
Figure 2F:
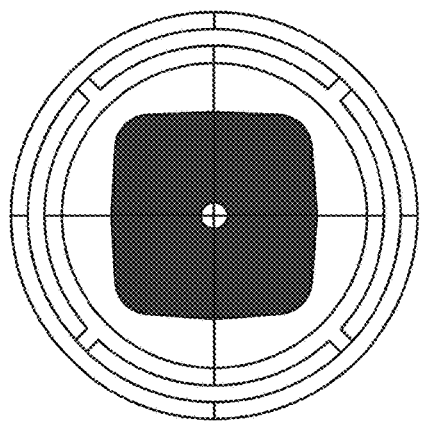
FIG. 2F shows a top view of a simulation of the contact area of the check valve.
Figure 2G:
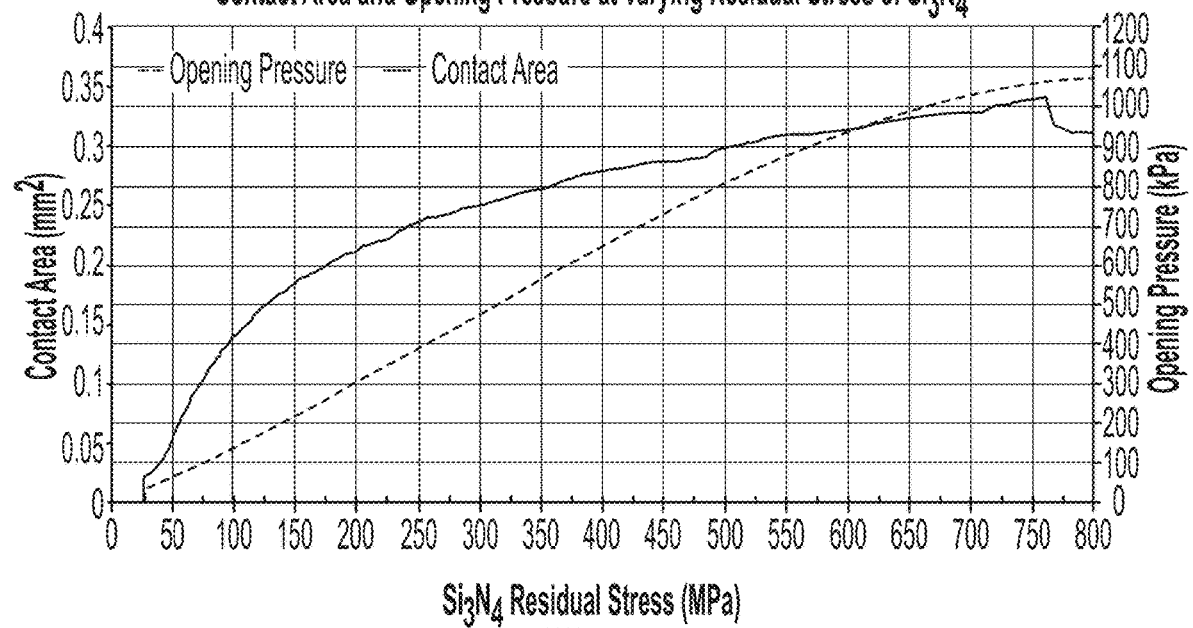
FIG. 2G is a graph showing a simulation of the surface contact area and opening pressure at varying residual stress of the check valve.

Finite element (FE) simulations are performed using the MEMS module of COMSOL 5.3a software to contemplate the structural contact between the silicon membrane and the bottom structure with the inlet channel opening, while the residual stress on the silicon membrane is increased. These simulation results support the proposed tuning of the valve characteristics to achieve the right balance between diffusion blocking capability and opening pressure. This also enables the inlet check valve to have a lower cracking pressure than the outlet check valve to ensure robust flow rectification in micropump applications. FIGS. 2D-2F show the diffusion-blocking check valve in a closed position. FIG. 2D shows a perspective view and FIG. 2E shows a cross-sectional view of simulation results of the device with 800 MPa of compressive residual stress in the $Si_3N_4$ layer. FIG. 2F shows a top view of a simulation of the contact area of the valve. FIG. 2G is a graph showing the simulated surface contact area between the membrane and the wafer handle as a function of Si$_3$N$_4$ residual stress, along with the required fluid pressure to open the valve from the inlet side.

Prophetic Example 2—Conceptual Design of Diffusion-Blocking Check Valve

A MEMS fabrication process can be used with optically flat, single crystal silicon sealing surfaces, biased closed via compressive stress of a patterned thin film. This design will provide angstrom-level contact, with membrane to wafer handle separation limited only by surface roughness, with controllable opening pressures. The silicon-on-insulator (SOI) dramatically reduces the distance between the valve seat and the moveable membrane, with the addition of the compressively stressed thin film to bias the valve closed. A leak-free check valve is designed and simulated using COMSOL Microphysics® as shown in FIG. 3.

Figure 3A:
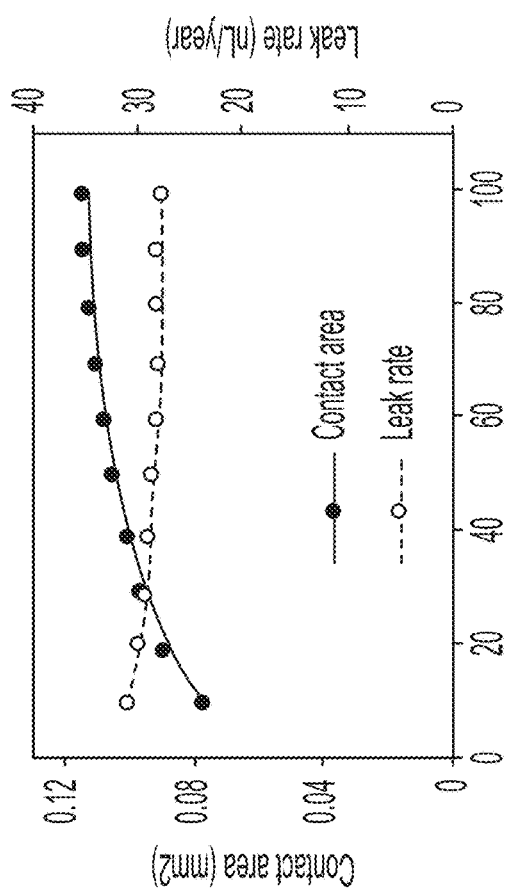
FIG. 3A is a schematic showing an embodiment of a perspective view of a conceptual design for a one-way diffusion-blocking check valve.
Figure 3B:
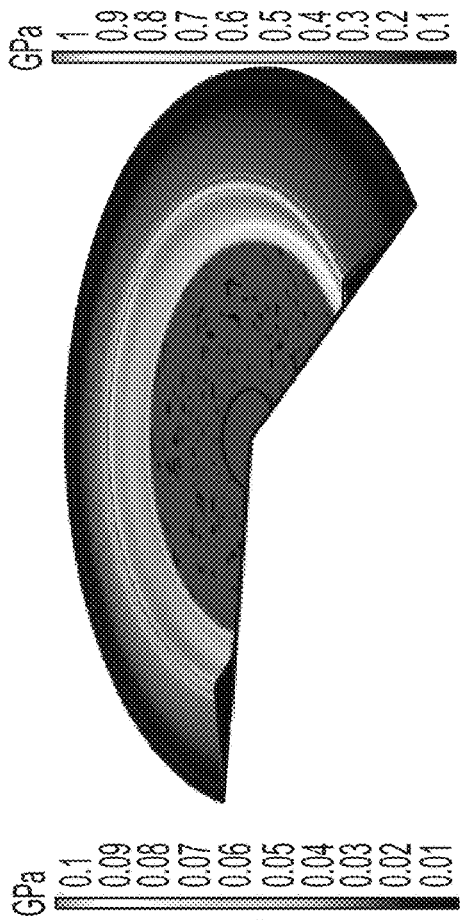
FIG. 3B is a graph showing a simulation of the surface contact area and leakage rate at varying residual stress of the check valve.
Figure 3C:
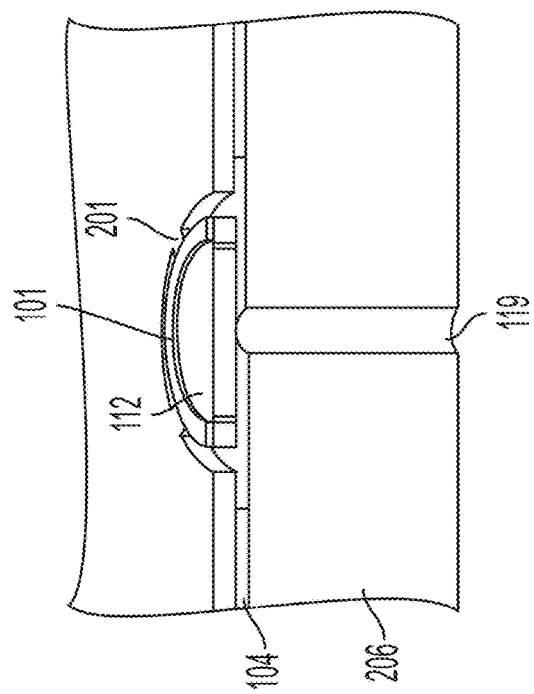
FIG. 3C is a perspective view showing deflection of the membrane due to 10 MPa thin film stress.
Figure 3D:
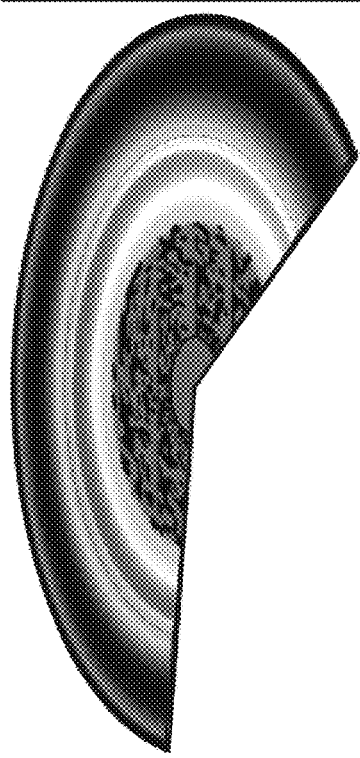
FIG. 3D is a perspective view showing deflection of the membrane due to 100 MPa thin film stress.

FIGS. 3A-D show a diffusion blocking check valve. FIG. 3A is a top view of the conceptual design (shown with zero stress in thin film 101 to illustrate the inlet 119 flow channel, not to scale). FIG. 3B is a graph showing finite element simulations of valve membrane deflection with different levels of compressive stress in the patterned Si$_3$N$_4$ thin film showing both the contact area and simulated leakage rate (nL/yr). FIG. 3C is a perspective view showing a simulation of the deflection of the membrane due to 10 MPa thin film stress, with induced stress in the Si membrane (false color) remaining below 0.1 GPa. FIG. 3D is a perspective view showing a simulation of the deflection of the membrane due to 100 MPa thin film stress, with induced stress in the Si (false color) remaining below 1 GPa. This is significantly below the 7 GPa yield strength of Si.

The simulated device geometry shown in FIG. 3A is a 4 tether 201 configuration, with the following parameters: 670 µm silicon handle wafer 206, 2 µm membrane thickness, 500 nm buried SiO$_2$ layer 104 that is etched away to form the gap between the membrane and silicon handle 206, 500 µm membrane 112 diameter, 200 nm layer of Si$_3$N$_4$ patterned to form a 10 µm wide ring 101 at the outer part of the membrane disc 112, 100 µm inlet channel 119 diameter, and each tether 201 with 50 µm width and length. The proposed SOI based check valve differs from conventional check valves with the addition of a silicon nitride (Si$_3$N$_4$) layer 101 with intrinsic residual stress from fabrication using a plasma enhanced chemical vapor deposition (PECVD) method. PECVD can allow the stress of film monolayers to be dynamically controlled during deposition to provide thin films of tunable stress from tensile to compressive. In this design, a compressively stressed film will generate a compressive load on the valve membrane to enforce a normally closed configuration of the check valve. Deep reactive ion etching (DRIE) can define the inlet channel and the outer perimeter for the release of the valve; or once integrated with the full micropump, the outer perimeter of the micropump. A hydrofluoric acid vapor etch can remove the buried oxide to release the valve membrane. COMSOL Multiphysics simulations predict robust closure of the gap between the membrane and the handle wafer, with contact area increasing as Si$_3$N$_4$ thin film stress increases (FIG. 3B). In the absence of backpressure, the cracking pressure (pressure at which the valve will open) is in the range of from 1.2 to 2.9 kPa, which is insignificant compared to the driving force of the wax thermal phase change actuator. To simulate leak rate the hydrodynamic resistance is estimated based on surface roughness of the two silicon surfaces in contact. Acosta-Alba measured the RMS surface roughness of silicon on insulator surfaces at a maximum of 2.95 Å which corresponds to a peak roughness of 4.17 Å assuming a 50% duty ratio.

A leak rate is simulated in the presence of 4 MPa backpressure, assuming a surface roughness of 10 Å with a 50% duty ratio. As shown in FIG. 3B, the simulated leak rate is below 30 nL/year which is negligible for this application. Reducing the peak surface roughness to the expected 5 Å reduces this leak rate by nearly an order of magnitude to below 4 nL/year. The induced stress in the valve Si membrane is shown in FIGS. 3C, 3D for thin film (Si$_3$N$_4$) stress of 10 MPa and 100 MPa respectively, demonstrating the thin film stress can be changed by an order of magnitude while still maintaining robust sealing and acceptable Si membrane stress.

Prophetic Example 3—Conceptual Design of a Pump Utilizing Two Diffusion-Blocking Check Valves A MEMS fabrication process can be used to fabricate the top wafer having an outlet check valve and pump chamber, as shown in FIG. 4A, in accordance with the following: Mask 1—Backside etch (100 µm) to define pump chamber and flow channel. Mask 2—PECVD Si$_3$N$_4$ deposition and patterning—controlled stress thin film. Mask 3—Topside etch to define valve membrane and tethers, and electrical connect cutout—etch stop on buried SiO$_2$. Mask 4—Backside DRIE for inlet channel and electrical connect cutout—etch stop on buried SiO$_2$. HF vapor etch to release valve membrane. The bottom wafer having an inlet check valve, heater and pump membrane, as shown in FIG. 4B, can be fabricated in accordance with the following: Mask 5—Dopant diffusion to define electrical contacts & serpentine heater. Mask 6—PECVD Si$_3$N$_4$ deposition and patterning—controlled stress thin film. Mask 7—Topside etch to define valve membrane and tethers—etch stop on buried SiO$_2$. Mask 8—Backside DRIE for inlet channel and to define pump actuation membrane—etch stop on buried SiO$_2$. HF vapor etch to release valve membrane. Fusion Bonded Assembly—Phase Change Actuator, as shown in FIG. 4B, can be fabricated in accordance with the following: O$_2$ plasma to activate surface for hydrophilic bonding. Wafer level alignment and contact. 300° C. anneal for 1 hour in N$_2$ environment. Mask 9—Backside DRIE to release pumps from the wafer. Wax deposition underneath pump membrane. Epoxy sealing of wax in actuation chamber. The pump can be inserted in a cylindrical tube capable of operating in an ultra-low flow rate regime.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A closed diffusion-blocking one-way flow check valve, comprising:
   a flow passage in a one-way direction through the check valve from an inlet to an outlet;
   a handle comprising the inlet on one side of the handle and a valve seat disposed on a side of the handle opposite the inlet side along the flow passage;
   a membrane comprising a flap tethered to the membrane by a plurality of tethers and the outlet comprising an opening adjacent the plurality of tethers between the membrane and the flap, wherein the flap comprises a valve seat contacting area on one side of the flap and an intrinsically stressed biasing element disposed on a side of the flap opposite the valve seat contacting area; and a spacer layer disposed between the handle and the membrane creating a portion of the flow channel between the handle valve seat and the flap valve seat contacting area, wherein the biasing element forces the valve seat contacting area of the flap against the valve seat of the handle biasing the check valve in a closed position relative to the flow passage.

2. The check valve of claim 1, wherein the valve seat contacting area and the valve seat are optically flat silicon-to-silicon sealing surfaces.

3. The check valve of claim 1, wherein the biasing element exerts a force sufficient to open the valve in response to an inlet pressure and an outlet pressure within a flow rate regime of from 1 nl/min to 5000 nl/min.

4. The check valve of claim 1, wherein the biasing element is tuned to a film stress of from 10 MPa to 100 MPa.

5. The check valve of claim 1, wherein the check valve has a diameter of less than 1 cm.

6. The check valve of claim 1, wherein the check valve has a thickness of less than 5 mm.

7. The check valve of claim 1, wherein the check valve has a thickness of less than 1 mm.

8. The check valve of claim 1, wherein the handle is silicon, the membrane is silicon, the spacer later is silicon oxide and the biasing element is silicon nitride.

9. The check valve of claim 1, wherein the check valve is tuned to an opening pressure of from 1.2 kPa to 2.9 kPa or from 220 kPa to 320 kPa.

10. A pump comprising:
a pump actuation membrane connected to an electrically operated heater disposed in a pump chamber of a flow channel between an inlet check valve comprising:
  a flow passage in a one-way direction through the check valve from an inlet to an outlet;
  a handle comprising the inlet on one side of the handle and a valve seat disposed on a side of the handle opposite the inlet side along the flow passage;
  a membrane comprising a flap tethered to the membrane by a plurality of tethers and the outlet comprising an opening adjacent the plurality of tethers between the membrane and the flap, wherein the flap comprises a valve seat contacting area on one side of the flap and an intrinsically stressed biasing element disposed on a side of the flap opposite the valve seat contacting area; and
  a spacer layer disposed between the handle and the membrane creating a portion of the flow channel between the handle valve seat and the flap valve seat contacting area, wherein the biasing element forces the valve seat contacting area of the flap against the valve seat of the handle biasing the check valve in a closed position relative to the flow passage and an outlet check valve comprising:
  a flow passage in a one-way direction through the check valve from an inlet to an outlet;
  a handle comprising the inlet on one side of the handle and a valve seat disposed on a side of the handle opposite the inlet side along the flow passage;
  a membrane comprising a flap tethered to the membrane by a plurality of tethers and the outlet comprising an opening adjacent the plurality of tethers between the membrane and the flap, wherein the flap comprises a valve seat contacting area on one side of the flap and an intrinsically stressed biasing element disposed on a side of the flap opposite the valve seat contacting area; and
  a spacer layer disposed between the handle and the membrane creating a portion of the flow channel between the handle valve seat and the flap valve seat contacting area, wherein the biasing element forces the valve seat contacting area of the flap against the valve seat of the handle biasing the check valve in a closed position relative to the flow passage, wherein the pump is disposed in a cylinder.

11. The pump of claim 10, wherein the inlet and outlet check valve biasing element exerts a force sufficient to open the respective valve in response to an inlet pressure and an outlet pressure within a flow rate regime of from 1 nl/min to 5000 nl/min.

12. The pump of claim 10, wherein the inlet and outlet check valves each have a diameter of less than 1 cm.

13. The pump of claim 10, wherein the inlet and outlet check valves each have a thickness of less than 5 mm.

14. The pump of claim 10, wherein the inlet and outlet check valves each have a thickness of less than 1 mm.

* * * * *